United States Patent
Ivanova et al.

(10) Patent No.: US 10,969,529 B2
(45) Date of Patent: Apr. 6, 2021

(54) SPOT LIGHTING DEVICE HAVING LIGHT GUIDE WITH PLURALITY OF LIGHT CONVERTING SEGMENTS

(71) Applicant: SIGNIFY HOLDING B.V., Eindhoven (NL)

(72) Inventors: Olena Ivanova, Eindhoven (NL); Martinus Petrus Joseph Peeters, Eindhoven (NL); Rémy Cyrille Broersma, Eindhoven (NL); Ludovicus Johannes Lambertus Haenen, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 433 days.

(21) Appl. No.: 15/768,872

(22) PCT Filed: Oct. 4, 2016

(86) PCT No.: PCT/EP2016/073647
§ 371 (c)(1),
(2) Date: Apr. 17, 2018

(87) PCT Pub. No.: WO2017/067781
PCT Pub. Date: Apr. 27, 2017

(65) Prior Publication Data
US 2020/0241190 A1      Jul. 30, 2020

(30) Foreign Application Priority Data

Oct. 20, 2015 (EP) .................................... 15190512
May 20, 2016 (EP) .................................... 16170573

(51) Int. Cl.
*G02B 6/00*       (2006.01)
*F21V 8/00*       (2006.01)

(52) U.S. Cl.
CPC .................................. *G02B 6/0003* (2013.01)

(58) Field of Classification Search
CPC ... F21V 5/10; F21V 9/10; F21V 13/08; G02B 6/0003; G02B 6/0026
See application file for complete search history.

(56) References Cited

U.S. PATENT DOCUMENTS

| 5,806,955 A | 9/1998 | Parkyn, Jr. et al. |
| 7,316,497 B2 * | 1/2008 | Rutherford ............ H04N 9/315 348/E9.027 |

(Continued)

FOREIGN PATENT DOCUMENTS

| WO | WO2008042703 A1 | 4/2008 |
| WO | WO2013173760 A1 | 11/2013 |
| WO | WO2015113979 A1 | 8/2015 |

*Primary Examiner* — Ismael Negron

(57) ABSTRACT

A lighting device includes at least one first light-emitting element configured to emit a first light of a first wavelength range; and a light guide having axially opposite first and second base surfaces, and a plurality of segments, each with a first light in-coupling surface formed on a lateral surface of the light guide, each of the segments configured to convert at least a part of input light into second light having a selected wavelength range. At least a portion of the first base surface includes a second light in-coupling surface and at least a portion of the second base surface includes a light out-coupling surface. The lighting device is optically coupled to the second light in-coupling surface such that the first light is coupled into the light guide, and the first light emitting element is configured to reflect at least part of the second light thereon having a wavelength within at least one of the selected wavelength ranges back into the light guide.

14 Claims, 4 Drawing Sheets

(56) References Cited

U.S. PATENT DOCUMENTS

| | | | |
|---|---|---|---|
| 7,982,229 B2* | 7/2011 | Bechtel | F21K 9/61 |
| | | | 257/98 |
| 8,684,555 B2* | 4/2014 | Hofmann | A61N 5/0601 |
| | | | 362/230 |
| 9,482,937 B2* | 11/2016 | Cheng | G03B 21/2013 |
| 9,810,826 B2* | 11/2017 | Chestakov | G03B 21/16 |
| 10,222,540 B2* | 3/2019 | Hikmet | F21S 43/239 |
| 10,473,275 B2* | 11/2019 | Peeters | G02B 6/0068 |
| 10,544,911 B2* | 1/2020 | Van Bommel | G02B 6/0031 |
| 2007/0018558 A1 | 1/2007 | Chua et al. | |
| 2007/0018559 A1 | 1/2007 | Jeng | |
| 2011/0018020 A1 | 1/2011 | Jagt | |
| 2011/0116261 A1* | 5/2011 | Brukilacchio | F21V 29/70 |
| | | | 362/231 |
| 2020/0033707 A1* | 1/2020 | Sakata | H04N 9/3152 |
| 2020/0088927 A1* | 3/2020 | Denissen | G02B 6/0068 |

* cited by examiner

SPOT LIGHTING DEVICE HAVING LIGHT GUIDE WITH PLURALITY OF LIGHT CONVERTING SEGMENTS

CROSS-REFERENCE TO PRIOR APPLICATIONS

This application is the U.S. National Phase application under 35 U.S.C. § 371 of International Application No. PCT/EP2016/073647, filed on Oct. 4, 2016, which claims the benefit of European Patent Applications Nos. 16170573.6, filed on May 20, 2016, and 15190512.2, filed on Oct. 20, 2015. These applications are hereby incorporated by reference herein.

TECHNICAL FIELD

The present invention generally relates to the field of lighting devices. Specifically, the present invention relates to a lighting device comprising a light guide which includes segments, wherein each of the segments is configured to convert at least a part of light input therein into light having a selected wavelength range, and each segment may be 'pumped' with light from a light source.

BACKGROUND

Lighting devices that are capable of providing light having a relatively high intensity, and in particular white light, are interesting in a number of applications such as, for example, spot lighting, headlamps, stage-lighting and digital light projection. For example, relatively high brightness and relatively high color rendering index (CRI) spot lighting applications are interesting for, e.g., lighting in retail and in museums. In applications such as mentioned above, solid state based light sources such as light-emitting diodes (LEDs) are often used as light sources. Compared to incandescent lamps, fluorescent lamps, gas discharge lamps, etc., solid state based light sources may provide numerous advantages such as, inter alia, longer operational life, reduced power consumption, higher efficacy, less heat generation, less infrared (IR) light in the light beam, and allowing or facilitating for providing 'green', environmentally friendly products (e.g., not including mercury). For example in retail applications it may be desirable to be able to obtain a luminous flux of between about 3 klm and 5 klm from a relatively small light source in order to make a compact, narrow-beam spot lighting module. Chip on Board (COB) LED sources may for example be used as light sources. In order to generate a luminous flux between about 3 klm and 5 klm, a light emitting surface (LES) with a surface area between about 100 mm$^2$ to 200 mm$^2$ might be needed.

WO 2015/113979 A1 discloses a light emitting device with a light guide being adapted for converting at least a part of in-coupled light to converted light with a different spectral distribution, whereby a large amount of the converted light will stay in the light guide and which can subsequently be extracted from a light exit surface of the light guide, leading to a high intensity gain. However, there is still need in the art for improved lighting devices capable of providing light, and in particular white light, having a relatively high intensity.

WO 2008/042703 A1 discloses a projection system which contains an illumination system having at least a first source of incoherent light capable of generating light in a first wavelength range. The illumination system also includes a body containing a fluorescent material that emits light in a second wavelength range, different from the first wavelength range, when illuminated by light in the first wavelength range. The system further includes at least a second fluorescent material that absorbs light in at least one of the first and second wavelength ranges, and emits light in a third wavelength range. The body has an extraction area, and at least some of the light in either the second or third wavelength ranges is internally reflected within the body to the extraction area.

US 2007/0018559 A1 discloses a device and method for emitting output light utilizing multiple light sources to produce original light having different peak wavelengths. A first light source of the device is configured to generate first light having a peak wavelength in the blue wavelength range, while a second light source of the device is configured to generate second light having a peak wavelength in the red wavelength range. Some of the original light emitted from at least the first light source is converted into light having a peak wavelength longer than the peak wavelength of the original light using a photoluminescent material to produce the output light.

SUMMARY

The High Lumen Density (HLD) technology developed by Philips can be used to generate extremely high light flux densities. The HLD technology uses a light guide, or light rod, made of photo-luminescent material such as one or more phosphors, to concentrate LED light into a very small area, thereby boosting the brightness of the light source used significantly. For example, by a using a HLD light rod, a luminous flux of about 10 klm of green light may be generated from a LES of about 2.5 mm$^2$.

White light may be generated by combining such a HLD light rod emitting green light with light emitted directly from a relatively high brightness blue LED and light emitted directly from a red LED, for example by means of a dichroic cross or dichroic mirror. FIG. 1 schematically illustrates a lighting device 15 comprising such an arrangement for generating white light. The lighting device 15 comprises a HLD light rod 1 emitting green light, which HLD light rod 1 may be 'pumped' with light for example emitted from blue LEDs 2 (of which only some are indicated by reference numerals 2 in FIG. 1), which for example may be arranged along a lateral surface of the HLD light rod 1 as illustrated in FIG. 1. The green light emitted by the HLD light rod 1 is combined by means of a dichroic cross 3 with light emitted from a blue LED 4 and light emitted from a red LED 5 so as to generate white light 6. In such a configuration, the spectral distribution of green light emitted by the HLD light rod (which for example may include green phosphor) may have a tail in the red part of the wavelength spectrum or spectral distribution, which may overlap with the wavelength spectrum or spectral distribution of the red light emitted by the red LED. If the dichroic cross or dichroic mirror is reflective for the red light emitted by the red LED, the tail in the red part of the wavelength spectrum or spectral distribution of the light emitted by the HLD light rod may be blocked by the dichroic mirror or dichroic cross. This may also be the case if a phosphor converted green LED would be used instead of a HLD light rod emitting green light. Due to the overlap between the tail in the red part of the wavelength spectrum or spectral distribution of the light emitted by the HLD light rod and the red light emitted by the red LED, the amount of red light required by the red LED in order to be able to achieve a sufficiently high luminous flux of the emitted light, which may be required or desired for the particular application (e.g., a spot lighting application), may increase significantly.

It is possible to make a lighting device capable of providing light, and in particular white light, having a relatively high intensity, based on the HLD concept only, without combining light emitted from a HLD light rod with light emitted directly from a relatively high brightness blue LED and light emitted directly from a red LED by means of a dichroic cross or dichroic mirror. Such a lighting device may utilize a blue light rod, pumped with ultraviolet/violet (UV) LEDs, in combination with a yellow/green light rod and a red light rod, pumped with blue LEDs, which blue, yellow/green and red light rods form a segmented light rod with blue, yellow/green and red segments. The light rod segments may be optically coupled to each other for example by way of optical glue. FIG. 2 schematically illustrates such a lighting device 16, which comprises a red light rod 7 pumped with blue LEDs 8, a green light rod 9 pumped with blue LEDs 10 and a blue light rod 11 pumped with UV/violet LEDs 12, for emitting white light 13. Only some of the blue LEDs 8, the blue LEDs 10 and UV/violet LEDs 12 are indicated by reference numerals 8, 10 and 12, respectively, in FIG. 2. The blue LEDs 8 and 10 and the UV/violet LEDs 12 may for example be arranged along a lateral surface of the red light rod 7, the green light rod 9 and the blue light rod 11, respectively, as illustrated in FIG. 2. In the context of the present application, by a blue, yellow/green or red light rod (or light guide), it is meant a light rod (or light guide) that is configured to convert at least a part of light input therein into blue, yellow/green or red light, respectively. Green/yellow light rods are commercially available from different suppliers. Blue light rods that can be pumped by UV/violet LEDs may comprise a so called BAM phosphor (e.g., $BaMgAl_{10}O_{17}:Eu^{2+}$), SAM ($SrMgAl_{10}O_{17}:Eu^{2+}$ or a so called YSO phosphor. However, material (e.g., phosphors) currently available or in development for red light rods, such as YGdAG:Ce, may be emitting at too short wavelengths to be able to obtain white light having a sufficiently high CRI which may be required for high-end spot lighting applications. Also, using such a combination of blue, yellow/green and red light rods, it may be difficult and/or unfeasible to generate white light with a sufficiently high CRI and a sufficiently low correlated color temperature (CCT). This is due to lack of available transparent red materials (i.e. transparent materials which can convert at least a part of light input therein into red light) that emit light at an appropriate wavelength, at about 620 nm for narrow red light emission and at about 640 nm for a broader red light emission.

In view of the above, a concern of the present invention is to provide a lighting device that facilitates providing light, and in particular white light, having a relatively high intensity.

Another concern of the present invention is to provide a lighting device that facilitates providing light, and in particular white light, having a relatively high CRI. To address at least one of these and other concerns, a lighting device in accordance with the independent claim is provided. Preferred embodiments are defined by the dependent claims.

According to a first aspect there is provided a lighting device. The lighting device comprises a light guide. The light guide has at least two ends, and extends in an axial direction between a first base surface at one of the ends of the light guide and a second base surface at another end of the light guide. The light guide comprises a plurality of segments. Each segment forms a section of the light guide. Each of the segments comprises a first light in-coupling surface located on a lateral surface of the light guide for coupling of light into the light guide. Each of the segments is configured to convert at least a part of light input therein into light having a selected wavelength range. The first base surface and the second base surface are located on different ones of the segments. At least a portion of the first base surface comprises a second light in-coupling surface for coupling of light into the light guide. At least a portion of the second base surface comprises a light out-coupling surface for coupling of light out of the light guide. The lighting device comprises at least one first light-emitting element configured to emit light of a first wavelength range. The at least one first light-emitting element is optically coupled to the second light in-coupling surface such that light emitted by the at least one first light-emitting element is coupled into the light guide via the second light in-coupling surface, wherein the at least one first light-emitting element is configured so as to reflect at least part of incident light thereon having a wavelength within at least one of the selected wavelength ranges back into the light guide.

Another way to describe the light guide is that it is a segmented light guide, where each of the segments is configured to convert at least a part of light input therein into light having a selected wavelength range, and where each segment may be 'pumped' with light from a light source. The segments may be pumped with light of different wavelength range, or color, via the respective first light in-coupling surfaces located on the lateral surface of the light guide. Since each of the segments is configured to convert at least a part of light input therein into light having a selected wavelength range, the light guide allows for mixing of light of different wavelength ranges within the light guide. Thereby, and since the light in-coupled into the light guide via the first light in-coupling surfaces and via the second light in-coupling surface may all be out-coupled from the light guide via the light out-coupling surface, the lighting device may facilitate providing light, and in particular white light, having a relatively high intensity.

As mentioned in the foregoing, the light guide has at least two ends, and extends in an axial direction between a first base surface at one of the ends of the light guide and a second base surface at another end of the light guide, with at least a portion of the first base surface comprising a second light in-coupling surface for coupling of light into the light guide, and with at least a portion of the second base surface comprising a light out-coupling surface for coupling of light out of the light guide. That is to say, light may be coupled into the light guide at one end thereof via the second light in-coupling surface, and light may be coupled out of the light guide via another end thereof via the light out-coupling surface, which hence can be considered to be opposite to the second light in-coupling surface with respect to the main direction of light within the light guide that is travelling or propagating towards the light out-coupling surface, and/or with respect to the axial direction.

Since the at least one first light-emitting element is optically coupled to the second light in-coupling surface such that light emitted by the at least one first light-emitting element is coupled into the light guide via the second light in-coupling surface, the second light in-coupling surface can be considered as (substantially) transparent for light having a wavelength within the first wavelength range. As mentioned in the foregoing, the at least one first light-emitting element is configured so as to reflect at least part of incident light thereon having a wavelength within at least one of the selected wavelength ranges. For achieving or implementing such capability the at least one first light-emitting element may for example be configured so as to exhibit a certain reflectivity with respect to light within at least one of the selected wavelength ranges, which as such is known in the art. By way of the at least one first light-emitting element being configured so as to reflect at least part of incident light thereon having a wavelength within at least one of the selected wavelength ranges (e.g., the selected wavelength range of the segment that comprises the second light in-coupling surface, or all of the selected wavelength ranges) back into the light guide, any part of the wavelength spectrum or spectral distribution of light that is converted in the light guide, for example in the segment that comprises the second light in-coupling surface, which part corresponds to the first wavelength range (e.g., the red part of the wavelength spectrum or spectral distribution of light that is converted in the segment in case the first wavelength range is in the red part of the wavelength spectrum), may not be lost from the light guide via the second light in-coupling surface (or such losses may only be relatively small). The smaller the fraction of light which is converted in the segment that comprises the second light in-coupling surface that is lost from the light guide via the second light in-coupling surface, the smaller the required amount of direct light of the first wavelength range emitted by the at least one first light-emitting element may be.

As mentioned in the foregoing, the second light in-coupling surface, via which light having a wavelength within the first wavelength range is coupled into the light guide, is located at the first base surface of the light guide at one of the ends and at one of the segments of the light guide, while the first light in-coupling surface of the same segment is located on the lateral surface of the light guide. For example in accordance with one or more embodiments of the present invention, for facilitating or enabling emission of white light from the lighting device, the at least one first light-emitting element may be configured to emit red light, or red-amber light, and the segment which includes the first base surface may be configured to convert at least a part of light input into the segment into green light. The segment which includes the second base surface may be configured to convert at least a part of light input into the segment into blue light. By means of an arrangement of the light guide such as described in the foregoing, the amount of red light, which often is a limiting factor for achieving a relatively high brightness of white light, required for obtaining a sufficiently high luminous flux of the light emitted by the lighting device may become smaller, for example as compared to employing an arrangement as described in the foregoing with reference to FIG. 1 where green light from a HLD light rod is combined by means of a dichroic cross with light emitted directly from a relatively high brightness blue LED and light emitted directly from a red LED. Thereby, the lighting device may facilitate providing light, and in particular white light, having a relatively high brightness.

For example in case the fraction of incident light having a wavelength within at least one of the selected wavelength ranges that the at least one first light-emitting element is capable of reflecting back into the light guide is too low or insufficient for a particular application, the lighting device may comprise at least one optical filter. The at least one first light-emitting element may be optically coupled to the second light in-coupling surface by way of the at least one optical filter. The at least one optical filter may be arranged so as to receive light emitted by the at least one first light-emitting element. The at least one optical filter may for example be coupled to the at least one first light-emitting element, or to the second light in-coupling surface. The at least one optical filter may be configured so as to transmit incident light thereon having a wavelength within the first wavelength range through the optical filter and reflect at least part of incident light thereon having a wavelength within at least one of the selected wavelength ranges (e.g., the selected wavelength range of the segment that comprises the second light in-coupling surface) back into the light guide. For example in the case where the at least one first light-emitting element may be configured to emit red light, or red-amber light, and the segment which includes the first base surface may be configured to convert at least a part of light input into the segment into green light, the at least one optical filter may be provided in case the reflectivity of the at least one first light-emitting element is considered too low or insufficient for the green light that is generated in the segment including the first base surface.

For further explaining principles of one or more embodiments of the present invention, consider the exemplifying case where the at least one first light-emitting element may be configured to emit red light, or red-amber light, and the segment which includes the first base surface may be configured to convert at least a part of light input into the segment into green light. Thus, green light is generated in the segment which includes the first base surface. The segment which includes the second base surface may be configured to convert at least a part of light input into the segment into blue light. As mentioned in the foregoing, the second light in-coupling surface, via which light having a wavelength within the first wavelength range is coupled into the light guide, is located at the first base surface of the light guide at one of the ends and at one of the segments of the light guide, while the first light in-coupling surface of the same segment is located on the lateral surface of the light guide. The light guide may be arranged so as to enable guiding or conveying light within the light guide by means of the light undergoing multiple reflections within the light guide, such as, for example, by means of multiple reflections at an interface between the light guide and its exterior, via so called total internal reflection (TIR). Light generated in the light guide by way of light in-coupled via the first light in-coupling surfaces, e.g., the green light generated in the segment which includes the first base surface, may be characterized according to the angle of incidence thereof on the internal surfaces of the light guide defining the interface between the light guide and its exterior. Some light may have an angle of incidence outside the angle of incidence range for TIR for all internal surfaces of the light guide this fraction of light is thereby coupled out from the light guide. Some light may have an angle of incidence that is within the angle of incidence range for TIR for the first light in-coupling surfaces, but outside the angle of incidence range for TIR for the second light in-coupling surface. About half of this fraction of light may travel toward the second light in-coupling surface, and the other half may travel toward the light out-coupling surface. The fraction of light which may travel toward the second light in-coupling surface and which is outside the angle of incidence range for TIR for the second light in-coupling surface may be less than about 50%, or even less than about 20%, of the light generated in the light guide by way of light in-coupled via the first light in-coupling surfaces. Some light may have an angle of incidence that is within the angle of incidence range for TIR for all internal surfaces of the light guide. This latter fraction of light may possibly only leave the light guide by way of, e.g., residual scattering or surface defects on the light guide, or an extraction structure or optical element, which for example may be coupled to the light out-coupling surface of the light guide. The at least one first light-emitting element, and possibly the optical filter, may be configured so as to reflect green light and blue light incident thereon. Thereby, at least a part of the green light and blue light which is generated in the light guide, and which is travelling toward the second light in-coupling surface and has an angle of incidence that is outside the angle of incidence range for TIR for the second light in-coupling surface, may be reflected back into the light guide. Thereby, any red, or red-amber, part or tail of the wavelength spectrum or spectral distribution of the green light and blue light generated in the light guide may not be lost from the light guide at the second light in-coupling surface, and may subsequently be out-coupled from the light guide via the light out-coupling surface of the light guide. Thereby, a relatively high brightness of light, and in particular white light, emitted by the lighting device may be achieved.

At least one segment of the light guide may be configured to convert at least a part of light input therein into green light. At least one (other) segment may be configured to convert at least a part of light input therein into blue light.

As indicated in the foregoing, the segment of the light guide which includes the first base surface may be configured to convert at least a part of light input into the segment into green light. The segment which includes the second base surface may be configured to convert at least a part of light input into the segment into blue light.

As also indicated in the foregoing, the at least one first light-emitting element may for example be configured to emit red light.

The lighting device may comprise, for each segment of the light guide, at least one second light-emitting element configured to emit light of a second wavelength range into the first light in-coupling surface of the segment. For each or at least one segment of the light guide there may be provided a plurality of second light-emitting elements, which plurality of second light-emitting elements for example may be configured as a string of light-emitting elements. The at least one first light-emitting element and/or the at least one second light-emitting element may for example be controllable with respect to properties of light emitted therefrom. For example in case the at least one first light-emitting element and/or the at least one second light-emitting element comprise a solid state light emitter such as one or more LEDs, the color point of the light emitted by the lighting device may be tuned over a relatively wide range of color points by adjusting the current through the LED(s) or LED string(s).

According to one or more embodiments of the present invention, the at least one first light-emitting element may be configured to emit red light. The lighting device may comprise, for each segment of the light guide, at least one second light-emitting element configured to emit light of a second wavelength range into the first light in-coupling surface of the segment. The at least one second light-emitting element for the segment which includes the first base surface may for example be configured to emit blue light. The at least one second light-emitting element for the segment which includes the second base surface may for example be configured to emit ultraviolet light.

Each segment may form a section of the light guide along the extension of the light guide, or along the axial direction. According to one or more embodiments of the present invention, the light guide may comprise two segments. The plurality of segments of the light guide may be arranged in a succession between the first base surface and the second base surface, or between the second light in-coupling surface of the light guide and the light out-coupling surface of the light guide. According to one or more embodiments of the present invention, the plurality of segments of the light guide may be arranged in a succession between the first base surface and the second base surface, or between the second light in-coupling surface of the light guide and the light out-coupling surface of the light guide, according to the wavelength of their respective excitation spectrums. That is to say, the segments may be arranged in succession according to the respective selected wavelength ranges into which the respective segments are configured to convert at least a part of light input therein. The segment corresponding to the lowest wavelengths, i.e. the segment with the lowest excitation spectrum, is preferably the one on which the light out-coupling surface is situated.

The second light in-coupling surface is different from and possibly entirely separated from the first light in-coupling surface that is located on the same segment as the second light in-coupling surface. The second light in-coupling surface may be arranged at an angle to the first light in-coupling surface that is located on the same segment as the second light in-coupling surface. For example, the second light in-coupling surface may be arranged perpendicular, or substantially perpendicular, to the first light in-coupling surface that is located on the same segment as the second light in-coupling surface.

In the context of the present application, the lateral surface of the light guide should be understood as the outer surface or face of the light guide along the extension thereof. For example in case the light guide would be in form of a cylinder, with the first base surface at one of the ends of the light guide being constituted by the bottom surface of the cylinder and the second base surface at the other end of the light guide being constituted by the top surface of the cylinder, the lateral surface is the side surface of the cylinder.

As indicated in the foregoing, the light guide may be constituted by or include a structure arranged to enable propagation of light coupled into it, or convey or guide light coupled into it, for example along a direction in which the light guide extends, propagating or travelling towards the light out-coupling surface. Light may for example be guided or conveyed within the light guide by means of undergoing multiple reflections within the light guide, such as, for example, by means of multiple reflections at an interface between the light guide and its exterior, via so called total internal reflection (TIR).

The light guide may for example comprise photo-luminescent material. According to one or more embodiments of the present invention, for achieving that each segment is configured to convert at least a part of light input therein into light having a selected wavelength range, different types of photo-luminescent material may be provided in at least some of the segments, and/or different densities of (possibly the same) photo-luminescent material may be provided in at least some of the segments. Irrespective of whether the light guide comprises photo-luminescent material or some other material for achieving that each segment is configured to convert at least a part of light input therein into light having a selected wavelength range, the respective selected wavelength ranges, which the segments are configured to convert inputted light into, may be different, or some may be the same or substantially the same (e.g., having some overlap).

Photo-luminescent material should, in the context of the present application, be understood as any material that is capable of light emission from the material after its absorption of photons. Examples of photo-luminescent materials which may be used in conjunction with embodiments of the present invention may for example include at least one phosphor or a mixture or aggregate of several different phosphors, and/or quantum confinement structures.

The term "quantum confinement structures" should, in the context of the present application, be understood as e.g. quantum wells, quantum dots, quantum rods, or nano-wires. A quantum well is a potential well with only discrete energy values and may be formed in semiconductors by having a material, like gallium arsenide or indium gallium nitride sandwiched between two layers of a material with a wider band gap, like aluminum arsenide or gallium nitride. Quantum dots (or rods, or nano-wires) are small crystals of semiconducting material generally having a size, e.g. width, radius or diameter, of only a few nanometers. When excited by incident light, a quantum dot emits light of a color determined by the size and material of the crystal. Light of a particular color can therefore be produced by adapting the size and/or material of the quantum dots. Most known quantum dots with emission in the visible range of the electromagnetic spectrum are based on cadmium selenide (CdSe) with a shell (or shells) such as cadmium sulfide (CdS) and zinc sulfide (ZnS). Cadmium free quantum dots such as indium phosphide (InP), and copper indium sulfide ($CuInS_2$) and/or silver indium sulfide ($AgInS_2$) can also be used. Quantum dots generally have very narrow emission band and can thus provide saturated colors. Furthermore the color of emitted light can be tuned by adapting the size of the quantum dots. It is to be understood that any type of quantum confinement structures known in the art may be used in embodiments of the present invention, provided that the quantum confinement structures have the appropriate wavelength conversion characteristics. However, it may be preferred for reasons of environmental safety and concern to use cadmium-free quantum confinement structures or at least quantum confinement structures having relatively low cadmium content.

The at least one first light-emitting element may be configured to emit light having a wavelength (or that is within a wavelength range) that the photo-luminescent material is not able to absorb.

The at least one optical filter may for example comprise at least one dichroic filter and/or at least one dichroic mirror, or any other type of optical filter capable of transmitting incident light having a wavelength within the first wavelength range through the optical filter.

The at least one first light-emitting element may comprise at least one light source configured to emit light of the first wavelength range.

The at least one first light-emitting element may comprise at least one first optical element. The at least one first optical element may be configured to receive light emitted by the at least one light source, shape the received light, and emit the shaped light. The at least one first optical element may be optically coupled to the second light in-coupling surface such that light emitted by the at least one first optical element is coupled into the light guide via the second light in-coupling surface.

As described in the foregoing, the at least one first light-emitting element may for example be configured to emit red light, or red-amber light, and the segment which includes the first base surface may be configured to convert at least a part of light input into the segment into green light. Green light may hence be generated in the segment which includes the first base surface. The segment which includes the second base surface may be configured to convert at least a part of light input into the segment into blue light. The second light in-coupling surface, via which light having a wavelength within the first wavelength range is coupled into the light guide, is located at the first base surface of the light guide at one of the ends and at one of the segments of the light guide, while the first light in-coupling surface of the same segment is located on the lateral surface of the light guide. The light guide may be arranged so as to enable guiding or conveying light within the light guide by means of the light undergoing multiple reflections within the light guide, such as, for example, by means of multiple reflections at an interface between the light guide and its exterior, via TIR. Thus, light of certain color (e.g., blue and green light) may hence be generated within the light guide by means of the light conversion carried out by the segments (e.g., by means of photo-luminescence, such as by phosphor light conversion), while other light of other color (e.g., red light) may be in-coupled into the light guide. Due to the difference in how the blue and green light and the red light in the light guide are created, the phase spaces (which in the context of the present application should be understood as the locations and the angles of rays of light e.g. with respect to a main direction in which the light is generally directed) of the red light and of the blue and green light that propagate within the light guide via TIR may be (possibly very) different. If there is an air gap between the at least one first light-emitting element and the (second light in-coupling surface of the) light guide, red light may enter into the light guide while having a certain angular distribution of the light rays constituting the light. All or substantially all of this red light may be within the angle of TIR at the lateral surface of the light guide, and so the red light when incident on the light out-coupling surface may have the same or substantially the same angular distribution of the light rays constituting the light. On the other hand, blue and green light generated within the light guide by means of the light conversion carried out by the segments may when incident on the light out-coupling surface have a larger angular distribution of the light rays constituting the light compared to the red light when incident on the light out-coupling surface. In other words, the phase space of the red light when arriving at the light out-coupling surface may be (possibly much) smaller than the phase space of blue and green light when arriving at the light out-coupling surface. If all light (i.e. red light and blue and green light) is subsequently extracted from the light guide via the light out-coupling surface the resulting light beam output from the lighting device may exhibit a color non-uniformity. For example, the light beam may when illuminating a surface of an object exhibit a red spot surrounded by a blue/green halo, or vice versa.

The at least one first optical element may be configured in a suitable manner in order to reduce or even eliminate such color non-uniformity. For example, in accordance with one or more embodiments of the present invention the at least one first optical element may be configured to shape the received light so as to modify (e.g., increase) the angular distribution of the light rays of the light emitted by the at least one first optical element as compared to the light rays of the light emitted by the at least one light source such that the angular distribution of the light rays of the light emitted by the at least one first optical element corresponds to or matches, or comes closer to corresponding to or matching, the angular distribution of the light rays of the light within the light guide that has been converted by the segments. Thereby—while again considering the above-mentioned example where blue and green light is generated within the light guide by means of the light conversion carried out by the segments while red light is in-coupled into the light guide—the phase space of the red light when arriving at the light out-coupling surface by way of TIR may substantially the same or the same as the phase space of blue and green light when arriving at the light out-coupling surface by way of TIR. By employing such at least one first optical element it may at the same time be possible to increase the efficiency of the in-coupling of the light emitted by the at least one first light-emitting element into the light guide via the second light in-coupling surface. The at least one first optical element may for example comprise a compound parabolic light concentrating element (CPC), or another type of light concentrating element. The material of the at least one first optical element (e.g., the CPC) may for example be selected so that it has a refractive index that is smaller or equal to the refractive index of the material which the light guide is made of. The shape of the light out-coupling surface of the at least one first optical element may for example be rectangular (or otherwise polygonal), circular, or oval. The at least one first optical element may be shaped or arranged such that a light in-coupling surface of the at least one first optical element has a larger surface area than the light out-coupling surface of the at least one first optical element and the second light in-coupling surface of the light guide. The at least one first optical element may alternatively have several tapered sides which may taper away from a light in-coupling surface of the at least one first optical element.

The at least one first light-emitting element may comprise a plurality of light sources.

The at least one first optical element may be configured to mix the light received from the plurality of light sources prior to shaping the received light. By mixing the light received from the plurality of light sources prior to shaping the received light—while again considering the above-mentioned example where blue and green light is generated within the light guide by means of the light conversion carried out by the segments while red light is in-coupled into the light guide—the phase space of the red light when the red light is coupled into the light guide at the second light in-coupling surface may be filled to large extent, or even be completely—or substantially completely—filled. By the phase space of light when being coupled into the light guide at the second light in-coupling surface being completely—or substantially completely—filled, it is in the context of the present application meant that the light rays of the light incident on the second light in-coupling surface of the light guide are distributed within (about) ±90° with respect to a longitudinal axis of the light guide at all points on the second light in-coupling surface when seen in a plane through the light guide, which plane contains the longitudinal axis (or an axial direction) of the light guide (e.g., when seen in a longitudinal cross section of the light guide). The at least one first optical element may for example comprise a light mixing structure configured receive light emitted by the plurality of light sources. The light mixing structure may for example have a light out-coupling surface that is optically coupled to a light in-coupling surface of the CPC. In alternative or in addition to employing a light mixing structure, at least one of the plurality of light sources may be arranged so as to have a relatively large light emitting surface. At least one of the plurality of light sources may for example comprise a COB LED light source.

The lighting device may comprise a second optical element, which may facilitate output of light from the lighting device. The second optical element may comprise a light in-coupling surface that is (optically) coupled to the light out-coupling surface of the light guide for in-coupling light, which has been out-coupled from the light guide, into the second optical element. The second optical element may be configured to shape light. The second optical element may be arranged to out-couple shaped light from a light out-coupling surface of the second optical element. Alternatively, the second optical element may be integrally formed with the light guide, e.g. by way of shaping a part or portion of the light guide such that an optical element is formed at an end of the light guide. The second optical element may for example comprise at least one collimator, at least one light concentrating element, at least one lens, at least one reflector, or any combination thereof. In addition or in alternative the second optical element may comprise another type of element capable of shaping light, e.g., so as to focus, converge and/or redirect light so as to attain a selected beam shape of light emitted from the lighting device and/or so as to produce a desired illumination pattern, e.g. so as to produce a spot light effect. The at least one light concentrating element may for example comprise a compound parabolic light concentrating element (CPC). An optical element such as a CPC may facilitate shaping the light out-coupled from a light out-coupling surface of the second optical element or CPC so that the out-coupled light has a distribution that is tailored to an acceptable etendue of a given application. A light out-coupling surface of the CPC may have a shape chosen as per the requirements of a give application. The shape of the light out-coupling surface of the CPC may for example be rectangular (or otherwise polygonal), circular, or oval. The light concentrating element may be shaped or arranged such that a light out-coupling surface of the light concentrating element has a larger surface area than the light out-coupling surface of the light guide. The light concentrating element may alternatively have several tapered sides which may taper towards a light in-coupling surface of the light concentrating element.

The second optical element may be configured to shape light having been in-coupled therein such that only light, the light rays of which have an angular distribution within the angular distribution of the light rays of the light which is in-coupled into the second optical element and which is of the first wavelength range, is out-coupled from the light out-coupling surface of the second optical element. Such capability of capacity of the second optical element may be provided in alternative or in addition to providing the lighting device with the at least one first optical element such as described in the foregoing. Such capability of capacity of the second optical element may be implemented or realized for example by appropriately choosing the materials of the light guide and the second optical element so that they have selected refractive indices. By means of such capability of capacity of the second optical element—while again considering the above-mentioned example where blue and green light is generated within the light guide by means of the light conversion carried out by the segments while red light is in-coupled into the light guide—the part or portion of the blue and green light, which arrives at the light out-coupling surface by way of TIR and that has an angular distribution of light rays which is not present in the red light arriving at the light out-coupling surface by way of TIR, may be rejected, or blocked, such that it is not out-coupled from the light guide. Thereby the phase space of the red light out-coupled from the light guide may be the same or substantially the same as the phase space of blue and green light out-coupled from the light guide. In this way, a beam of light output from the lighting device may exhibit a relatively low or even no color non-uniformity.

The light guide may for example be rod-shaped, or bar-shaped.

The light guide may be straight, or substantially straight, or curved. At least a portion of the light guide may be curved. At least a portion of the light guide may be straight, or substantially straight.

According to one or more embodiments of the present invention, the light guide may comprise a height H, a width W, and a length L extending in mutually perpendicular directions. Light within the light guide may be guided generally in along the length L of the light guide, which hence may be considered as the axial direction of the light guide. In accordance with these or more embodiments of the present invention, the first base surface at one of the ends of the light guide and the second base surface at the other end of the light guide may comprise a height H and a width W, respectively. According to one or more embodiments of the present invention, the length L of the light guide may be larger than the height H and width W of the light guide. The height H and width W of the light guide at the end of the light guide having the first base surface and second light in-coupling surface may be tuned to a LES of the at least one first light-emitting element. According to one or more embodiments of the present invention, the height H and width W at the end of the light guide having the first base surface and second light in-coupling surface may be the same or substantially the same. The area of the first base surface may for example be between about 5 mm$^2$ and 15 mm$^2$. The height H and width W at the end of the light guide having the first base surface and second light in-coupling surface may for example both be about 3 mm, and so the area of the first base surface may for example be about 9 mm$^2$.

The light guide may in principle have any cross-sectional shape in a cross section of the light guide perpendicular to the axial direction. According to one or more embodiments of the present invention, the light guide may have a cross-sectional shape in a cross section of the light guide perpendicular to the axial direction that has a polygonal shape, e.g. a shape of a square, a rectangle, a triangle, a pentagon, a hexagon, etc. According to one or more embodiments of the present invention, the light guide may have a cross-sectional shape in a cross section of the light guide perpendicular to the axial direction that is circular or oval.

The at least one first light-emitting element and/or the at least one second light-emitting element may for example include or be constituted by a solid state light emitter. Examples of solid state light emitters include inorganic LEDs, organic LEDs, laser diodes and light conversion elements such as phosphor plates, Lumiramic plates or phosphor conversion crystals. Solid state light emitters are relatively cost efficient light sources, since they in general are relatively inexpensive to manufacture, have a relatively high optical efficiency, have a relatively long lifetime and are environmentally friendly. However, in the context of the present application, the term "light-emitting element" should be understood to mean substantially any device or element that is capable of emitting radiation in any region or combination of regions of the electromagnetic spectrum, for example the visible region, the infrared region, and/or the ultraviolet region, when activated e.g. by applying a potential difference across it, passing a current through it or illuminating it with light of particular wavelengths. Therefore a light-emitting element can have monochromatic, quasi-monochromatic, polychromatic or broadband spectral emission characteristics. Examples of light-emitting elements include semiconductor, organic, or polymer/polymeric LEDs, violet LEDs, blue LEDs, red LEDs, green LEDs, amber LEDs, UV-A LEDs, UV-B LEDs, UV-C LEDs, optically pumped phosphor coated LEDs, optically pumped nano-crystal LEDs, lasers, laser pumped phosphor, laser pumped nano-crystals, optically pumped light conversion elements or any other similar devices as would be readily understood by a person skilled in the art. Furthermore, the term light-emitting element can, according to one or more embodiments of the present invention, mean a combination of the specific light-emitting element or light-emitting elements which emit the radiation in combination with a housing or package within which the specific light-emitting element or light-emitting elements are positioned or arranged. For example, the term light-emitting element can encompass a bare LED die arranged in a housing, which may be referred to as a LED package.

In the context of the present application, by blue light it is meant light in the blue color-range that may be defined as a wavelength range between about 380 nm and about 495 nm, or between about 450 nm and about 490 nm, for example about 475 nm.

Further in the context of the present application, by red light it is meant light in the red color-range that may be defined as a wavelength range between about 600 nm and about 700 nm, or between about 620 nm and about 700 nm, for example about 620 nm or 640 nm.

Further in the context of the present application, by yellow light it is meant light in the yellow color-range that may be defined as a wavelength range between about 560 nm and 590 nm, for example about 570 nm.

Further in the context of the present application, by green light it is meant light in the green color-range that may be defined as a wavelength range between about 520 nm and 560 nm, for example about 530 nm.

Further in the context of the present application, by UV light it is meant light in the ultraviolet color-range that may be defined as a wavelength range below about 420 nm.

Further in the context of the present application, by violet light it is meant light in the violet color range that may be defined as a wavelength range between about 400 nm and about 450 nm.

For obtaining blue light phosphors such as, for example, BAM, SAM, YSO, GYSO, LYSO, BGO, $CaF_2$ and/or Eu-doped glass may for example be used. For obtaining green light phosphors such as, for example, LUAG LuGaAG, and/or GaYAG may for example be used. For obtaining yellow light phosphors such as, for example, YAG and/or YGdAG may for example be used. For obtaining red light phosphors such as, for example, $Ba_3SiO_5$, SrO, CaS, $SRLi_2Si_2N_4$, Germanate Garnet, $Y_3Al_5O_{12}$:V,Ca and/or $YALO_3$:V,Ca may for example be used.

According to a second aspect there is provided a luminaire comprising a lighting device according to the first aspect. The luminaire may comprise wiring and electronics arranged to connect and power any light source(s) or light-emitting elements connected to or included in the lighting device, a housing for accommodating a least a portion or part of the lighting device and possibly other component(s), etc.

Further objects and advantages of the present invention are described in the following by means of exemplifying embodiments. It is noted that the present invention relates to all possible combinations of features recited in the claims. Further features of, and advantages with, the present invention will become apparent when studying the appended claims and the description herein. Those skilled in the art realize that different features of the present invention can be combined to create embodiments other than those described herein.

BRIEF DESCRIPTION OF THE DRAWINGS

Exemplifying embodiments of the invention will be described below with reference to the accompanying drawings.

Figure 1:
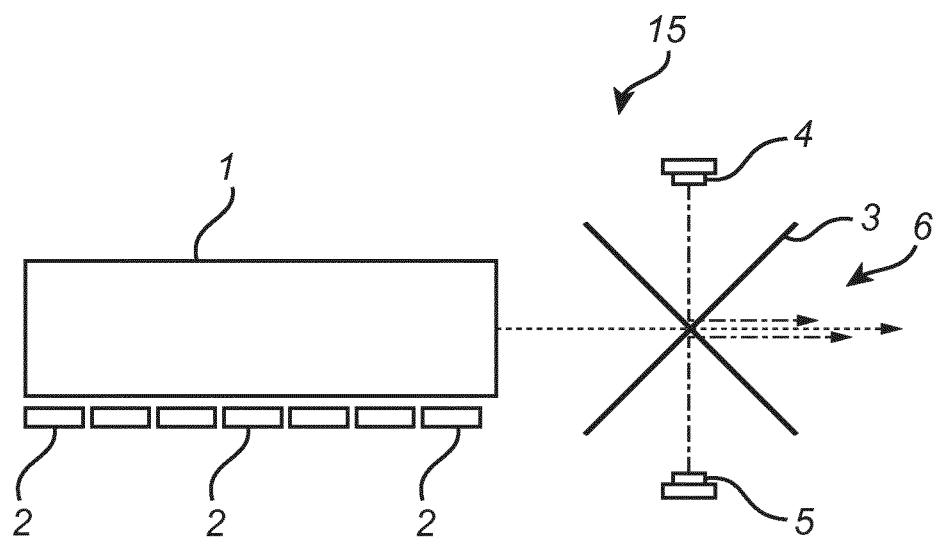
FIG. 1 is a schematic side view of a lighting device comprising a HLD light rod emitting green light, which green light is combined by means of a dichroic cross with light emitted directly from blue LED and light emitted directly from a red LED.
Figure 2:
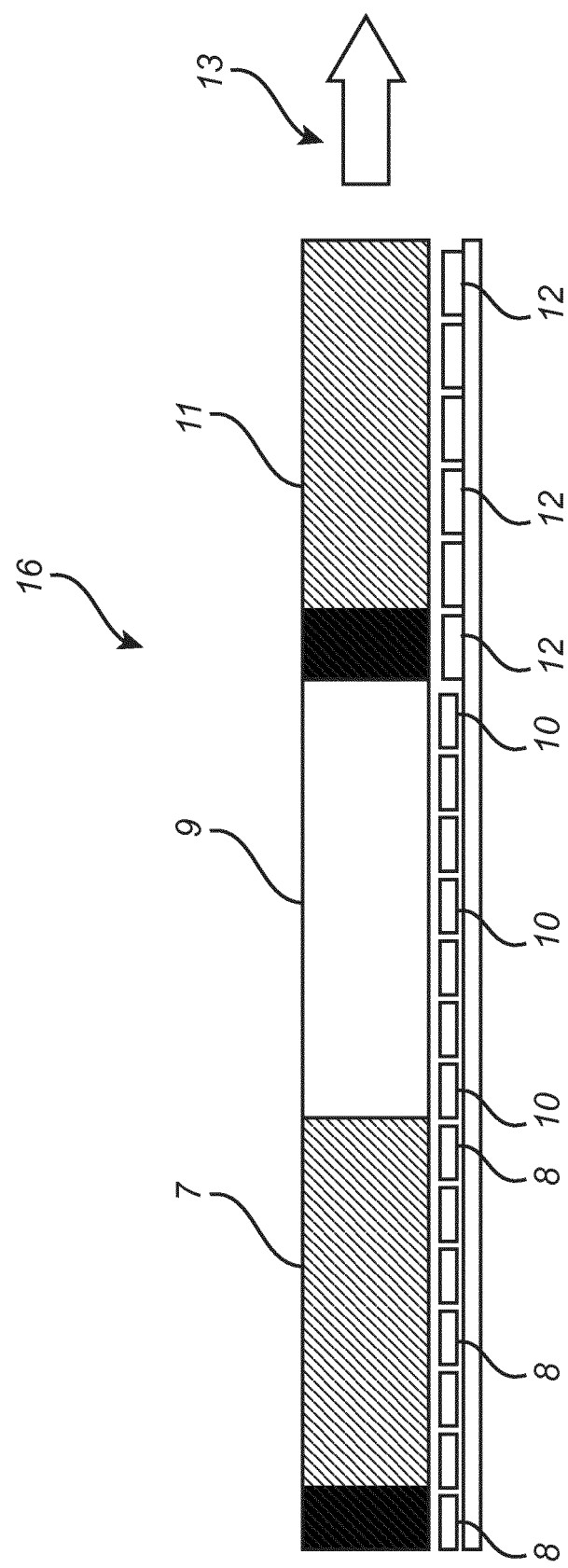
FIG. 2 is a schematic side view of a lighting device comprising a segmented light rod with blue, yellow/green and red segments.

All the figures are schematic, not necessarily to scale, and generally only show parts which are necessary in order to elucidate embodiments of the present invention, wherein other parts may be omitted or merely suggested.

DETAILED DESCRIPTION

The present invention will now be described hereinafter with reference to the accompanying drawings, in which exemplifying embodiments of the present invention are shown. The present invention may, however, be embodied in many different forms and should not be construed as limited to the embodiments of the present invention set forth herein; rather, these embodiments of the present invention are provided by way of example so that this disclosure will convey the scope of the invention to those skilled in the art. In the drawings, identical reference numerals denote the same or similar components having a same or similar function, unless specifically stated otherwise.

Figure 3:
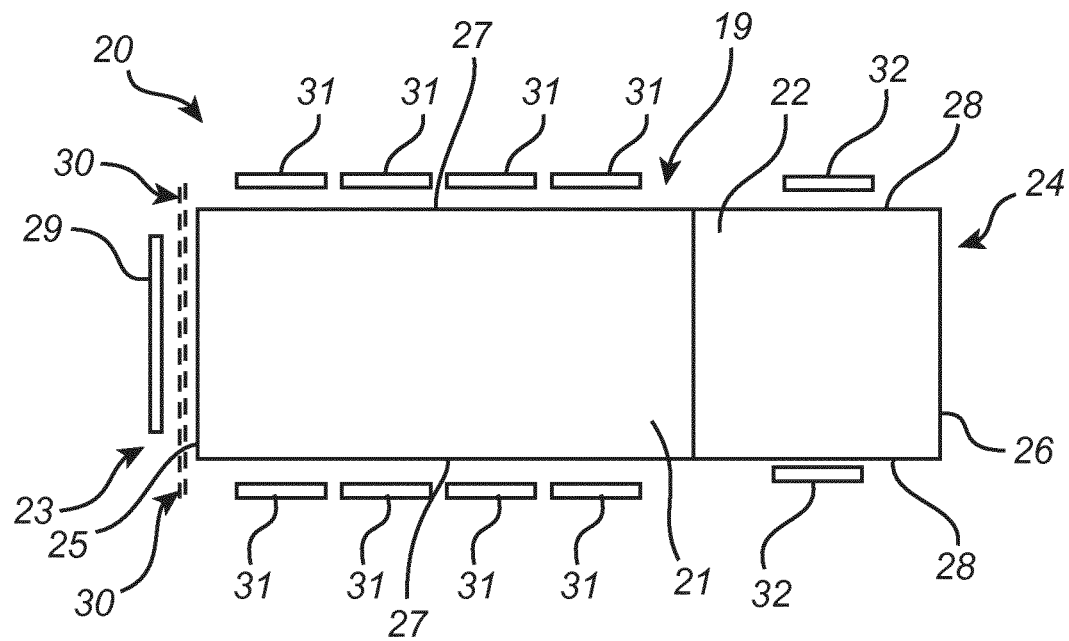
FIGS. 3 to 6 are schematic sectional side views of lighting devices according to embodiments of the present invention.

FIG. 3 is a schematic sectional side view of a lighting device 20 according to an embodiment of the present invention. It is to be understood that FIG. 3 is schematic, not necessarily to scale, and generally only depicts parts which are necessary in order to elucidate the illustrated embodiment of the present invention, whereas other parts may be omitted or merely suggested. The lighting device 20 comprises a light guide, schematically indicated at 19, having two ends 23, 24 and extending in an axial direction between a first base surface 25 at one of the ends 23 of the light guide 19 and a second base surface 26 at the other end 24 of the light guide 19. It is however to be understood that in accordance with one or more other embodiments of the present invention the light guide 19 may have more than two ends.

As illustrated in FIG. 3 the light guide 19 comprises two segments 21, 22, with each of the segments 21, 22 forming a section of the light guide 19. As illustrated in FIG. 3, the first base surface 25 and the second base surface 26 are located on different ones of the segments 21, 22. It is to be understood that in accordance with one or more other embodiments of the present invention, the light guide 19 may comprise more than two segments 21, 22. Each of the segments 21 and 22 comprises a first light in-coupling surface 27 and 28, respectively, located on a lateral surface of the light guide 19, for coupling of light into the light guide 19. As illustrated in FIG. 3, the lateral surface of the light guide 19 should in the context of illustrated embodiment of the present invention be understood as the outer surface or face of the light guide 19 along the extension thereof, i.e. along the extension of the light guide 19 between the first base surface 25 and the second base surface 26.

In accordance with the embodiment of the present invention illustrated in FIG. 3, the light guide 19 is rod-shaped or bar-shaped, and is straight. However, it is to be understood that this is exemplifying. Other shapes of the light guide 21, 21 are possible, and the light guide 19 does not necessarily have to be straight, or substantially straight, but may, in accordance with one or more other embodiments of the present invention, be curved. At least a portion of the light guide 19 may be curved, or a portion of the light guide 19 may be curved, and another portion of the light guide 19 may be straight, or substantially straight. By way of the light guide 19 being rod-shaped or bar-shaped in accordance with the illustrated embodiment of the present invention, the first base surface 25 and the second base surface 26 are constituted by the bottom surface and the top surface, respectively, of the light guide 19 (or light rod, or light bar), and the lateral surface of the light guide 19 is constituted by the side surface of the light guide 19 (or light rod, or light bar).

Each of the segments 21 and 22 is configured to convert at least a part of light input therein into light having a selected wavelength range. In order to realize or implement that each of the segments 21 and 22 is configured to convert at least a part of light input therein into light having a selected wavelength range, the light guide 19 may for example comprise photo-luminescent material. The selected wavelength ranges corresponding to the respective segments 21 and 22 may be different. To that end, different types of photo-luminescent material may be provided in the segments 21 and 22, and/or different densities of (possibly the same) photo-luminescent material may be provided in the segments 21 and 22. There may possibly be some overlap between the selected wavelength ranges corresponding to the respective segments 21 and 22. As indicated in the foregoing, in accordance with one or more embodiments of the present invention, the light guide 19 may comprise more than two segments 21, 22 each of which is configured to convert at least a part of light input therein into light having a selected wavelength range. The light guide 19 may comprise one or more segments that are not configured to convert at least a part of light input therein into light having a selected wavelength range, and which segments may be arranged substantially only to allow for propagation or travelling of light therein.

In accordance with the embodiment of the present invention illustrated in FIG. 3, the segment 21 which includes the first base surface 25 is configured to convert at least a part of light input into the segment 21 into green light, and the segment 22 which includes the second base surface 26 is configured to convert at least a part of light input into the segment 22 into blue light. That is, the segment 21 which includes the first base surface 25 is configured to convert at least a part of light input into the segment into light of a wavelength range between about 520 nm and 560 nm, and the segment 22 which includes the second base surface 26 is configured to convert at least a part of light input into the segment 22 into light of a wavelength range between about 380 nm and about 495 nm. The segment 21 may for example comprise a LuYAG single crystal doped with Ce. The segment 22 may for example comprise a so called BAM phosphor doped with Eu (e.g., $BaMgAl_{10}O_{17}:Eu^{2+}$).

In accordance with the embodiment of the present invention illustrated in FIG. 3, the first base surface 25 constitutes a second light in-coupling surface for coupling of light into the light guide 19 at the end 23 thereof. The first base surface 25 and/or the second light in-coupling surface may for example have a surface area of about 6-20 $mm^2$, for example about 9 $mm^2$. And further in accordance with the embodiment of the present invention illustrated in FIG. 3, the second base surface 26 constitutes a light out-coupling surface for coupling of light out of the light guide 19 at the end 24 thereof. It is however to be understood that according to one or more embodiments of the present invention, the second light in-coupling surface may be constituted by only a portion of the first base surface 25, and/or the light out-coupling surface may be constituted by only a portion of the second base surface 26.

The light guide 19 may be constituted by or include a structure arranged to enable propagation of light coupled into it, or convey or guide light coupled into it, for example along a direction in which the light guide 19 extends. Light coupled into the light guide 19 may then propagate or travel towards the light out-coupling surface comprised in the second base surface 26 of the segment 22 of the light guide 19. Light may for example be guided or conveyed within the light guide 19 by means of undergoing multiple reflections within the light guide 19, such as, for example, by means of multiple reflections at an interface between the light guide 19 and its exterior, via total internal reflection (TIR). The light guide 19 may comprise a material through which light can propagate, or travel. The light guide 19 may include material selected from the group including poly(methylmethacrylate) (PMMA) (sometimes referred to as acrylic glass), polycarbonate, glass, silicone and/or silicone rubber. According to one or more embodiments of the present invention, the light guide 19 may be comprised mostly or substantially entirely (or entirely) of photo-luminescent material.

The lighting device 20 comprises a first light-emitting element 29 configured to emit light of a first wavelength range. For example in accordance with one or more embodiments of the present invention, the first light-emitting element 29 may be configured to emit red light. That is to say, the first wavelength range may comprise a wavelength range between about 600 nm and about 700 nm, or between about 620 nm and about 700 nm, for example about 620 nm or 640 nm. The first light-emitting element 29 may for example comprise a PT-54 LED chip manufactured by Luminus Devices, Inc.

In accordance with the embodiment of the present invention illustrated in FIG. 3, the lighting device 20 comprises, for each of the segments 21, 22 a plurality of second light-emitting elements 31 and 32, respectively. The second light-emitting elements 31 of the segment 21 are configured to emit light of a second wavelength range into the first light in-coupling surface 27 of the segment 21. The second light-emitting elements 32 of the segment 22 are configured to emit light of a second wavelength range into the first light in-coupling surface 28 of the segment 22. Each or any one of the first light-emitting element 29 and second light-emitting elements 31, 32 may for example comprise a solid state based light source or solid state light emitter such as, for example, at least one inorganic LED, an organic LED, and/or a laser diode. The first light-emitting element 29 may for example comprise a red LED. One or more of the second light-emitting elements 31 may for example comprise a blue LED. One or more of the second light-emitting elements 32 may for example comprise an UV LED. It is to be understood that the lighting device 20 may comprise more than one first light-emitting element 29, such as two, three, five, or ten or more first light-emitting elements. Furthermore, it is to be understood that the number of second light-emitting elements 31 is exemplifying and in accordance with an embodiment of the present invention. In accordance with one or more other embodiments of the present invention, the number of second light-emitting elements 31 may be smaller or larger than the number of second light-emitting elements 31 illustrated in FIG. 3. Also, the number of second light-emitting elements 32 is exemplifying and in accordance with an embodiment of the present invention. In accordance with one or more other embodiments of the present invention, the number of second light-emitting elements 32 may be smaller or larger than the number of second light-emitting elements 32 illustrated in FIG. 3.

The first light-emitting element 29 is optically coupled to the second light in-coupling surface such that light emitted by the first light-emitting element 29 is coupled into the light guide 19 via the second light in-coupling surface. The first light-emitting element 29 is configured so as to reflect at least part of incident light thereon having a wavelength within any one of the selected wavelength ranges of the segments 21, 22 (i.e. the wavelength ranges corresponding to green light and blue light, respectively) back into the light guide 19.

In accordance with the embodiment of the present invention illustrated in FIG. 3, the lighting device 20 comprises an optical filter 30 arranged so as to receive light emitted by the first light-emitting element 29. The first light-emitting element 29 is optically coupled to the second light in-coupling surface by way of the optical filter 30. In accordance with the embodiment of the present invention illustrated in FIG. 3, the optical filter 30 is coupled to the second light in-coupling surface that is comprised in the first base surface 25. In alternative, the optical filter 30 could instead be coupled to the first light-emitting element 29. For example, the optical filter 30 could be deposited or arranged on a transparent element which is not in optical contact with the light guide 19, which transparent element for example could be arranged on a protecting cover of the first light-emitting device 29 (not shown in FIG. 3). The optical filter 30 is configured so as to transmit incident light having a wavelength within the first wavelength range through the optical filter 30, and reflect at least part of incident light thereon having a wavelength within any one of the selected wavelength ranges of the segments 21, 22 (i.e. the wavelength ranges corresponding to green light and blue light, respectively) back into the light guide 19. Thus, light emitted by the first light-emitting element 29 may be coupled into the light guide 19 via the second light in-coupling surface that is comprised in the first base surface 25. The optical filter 30 may for example comprise at least one dichroic filter and/or at least one dichroic mirror, or any other type of optical filter capable of transmitting incident light having a wavelength within the first wavelength range through the optical filter. As known in the art, a dichroic filter or a dichroic mirror is an optical filter or mirror which may have different reflection or transmission properties at different wavelengths or wavelength ranges. The optical filter 30 may be configured so as to transmit incident light having a wavelength within the first wavelength range through the optical filter 30 and block or reflect incident light having a wavelength outside the first wavelength range, or block or reflect incident light of a predefined wavelength range different from the first wavelength range.

It is to be understood that the optical filter 30 is optional. However, the optical filter 30 may be useful for example in case the fraction of light incident on the first light-emitting element 29 having a wavelength within at the selected wavelength ranges that the first light-emitting element 29 is capable of reflecting back into the light guide 19 is too low or insufficient for the particular application of the lighting device 20. Since each of the segments 21, 22 is configured to convert at least a part of light input therein into light having a selected wavelength range, the light guide 19 allows for mixing of light of different wavelength ranges within the light guide 19. Thereby, and since the light in-coupled into the light guide 19 via the first light in-coupling surfaces 27, 28 and via the second light in-coupling surface comprised in the first base surface 25 may all be out-coupled from the light guide 19 via the light out-coupling surface comprised in the second base surface 26, the lighting device 20 may facilitate providing light, and in particular white light, having a relatively high intensity.

For example, in accordance with one or more embodiments of the present invention, for facilitating or enabling emission of white light from the lighting device 20, the first light-emitting element 29 may be configured to emit red light, or red-amber light, and the segment 21 may be configured to convert at least a part of light input into the segment 21 into green light. The segment 22 may be configured to convert at least a part of light input into the segment 22 into blue light. The red light, or red-amber light, emitted by the first light-emitting element 29 is coupled into the light guide 19 at the second light in-coupling surface comprised in the first base surface 25 via the optical filter 30, which is configured so as to transmit incident red light, or red-amber light. By way of such a configuration of the lighting device 20, not all of the green light that is generated in the segment 21 may have to have to pass through the optical filter 30, but less than 50%, or even less, of the green light that is generated in the segment 21 may have to pass through the optical filter 30. Any tail in the red part of the spectrum or spectral distribution of the green light that is generated in the segment 21 and that is passed through the optical filter 30 may be blocked. This portion of the green light may have an angle of incidence thereof on the internal surfaces of the light guide 19 defining the interface between the light guide 19 and its exterior that is within the angle of incidence range for TIR for the first light in-coupling surfaces, but outside the angle of incidence range for TIR for the second light in-coupling surface. The tail in the red part of the spectrum or spectral distribution of the green light that is, the red tail of the green emission, will be transmitted through the optical filter 30 and might be lost from the light guide 19. However, part of the tail in the red part of the spectrum or spectral distribution of the green light transmitted through the optical filter 30 may be reflected from the first light-emitting element 29. Other parts or portion of the green light generated in the segment 21, such as light having an angle of incidence on the internal surfaces of the light guide 19 outside the angle of incidence range for TIR for all internal surfaces of the light guide 19, and light travelling toward the second light in-coupling surface, may never be affected by the optical filter 30. Thereby, by means of such a configuration of the lighting device 20, the amount of red light, which often is a limiting factor for achieving a relatively high brightness of white light, required for obtaining a sufficiently high luminous flux of the light emitted by the lighting device 20 may become smaller, for example as compared to employing an arrangement such as described in the foregoing with reference to FIG. 1. Thus, the lighting device 20 may facilitate providing light, and in particular white light, having a relatively high brightness.

The lighting device 20 may comprise more than one optical filter 30. In accordance with one or more other embodiments of the present invention, the lighting device 20 may comprise a combination of several optical filters (not shown in FIG. 3), with at least one of the several optical filters being arranged so as to receive light emitted by the first light-emitting element 29 and transmit incident light having a wavelength within the first wavelength range through the several optical filters.

Figure 4:
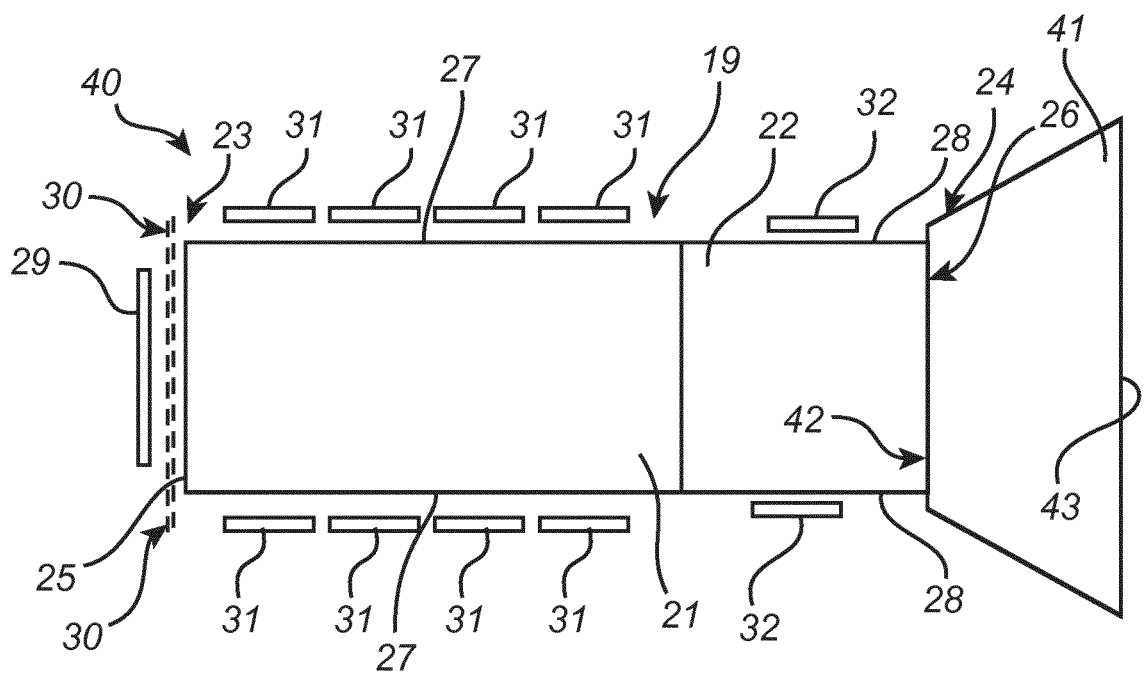

FIG. 4 is a schematic sectional side view of a lighting device 40 according to an embodiment of the present invention. The lighting device 40 illustrated in FIG. 4 is similar to the lighting device 20 illustrated in FIG. 3, and identical reference numerals in FIG. 3 and in FIG. 4 denote the same or similar components, having same or similar function, unless specifically stated otherwise. The lighting device 40 illustrated in FIG. 4 differs from the lighting device 20 illustrated in FIG. 3 in that the lighting device 40 illustrated in FIG. 4 comprises an optical element 41. The optical element 41 comprises a light in-coupling surface 42 optically coupled to the light out-coupling surface 26 of the light guide 19 for in-coupling light, having been out-coupled from the light guide 19, into the optical element 41. The optical element 41 is configured to shape light and arranged to out-couple shaped light from a light out-coupling surface 43 of the optical element 41. In accordance with the embodiment of the present invention illustrated in FIG. 4, the optical element 41 comprises a light concentrating element or light concentrator in the form of a CPC, having a quadrangular shape with a quadrangular cross section perpendicular to an axial direction of the optical element 41. However, other shapes of CPC, and other types of light concentrators than CPCs, are possible. For example, a light concentrator or CPC having the shape of a half sphere, or a spherical cap, may be used, by which it may be possible to extract a larger fraction of the light within the light guide from the light guide. The optical element may, according to one or more embodiments of the present invention, comprise secondary optics, for example for beam shaping purposes. As illustrated in FIG. 4, the optical element 41 in the form of a CPC may have tapered sides inclined outwardly from the light out-coupling surface 26 of the light guide 19 such that the light in-coupling surface 42 has a larger area than the light out-coupling surface 43. In alternative or in addition to a light concentrating element or light concentrator, e.g., in the form of a CPC, as illustrated in FIG. 4, the optical element 41 may comprise at least one collimator, at least one lens, at least one reflector, and/or another type of element capable of shaping light, e.g., so as to focus, converge and/or redirect light so as to attain a selected beam shape of light emitted from the lighting device 40 and/or so as to produce a desired illumination pattern, e.g. so as to produce a spot light effect.

Figure 5:
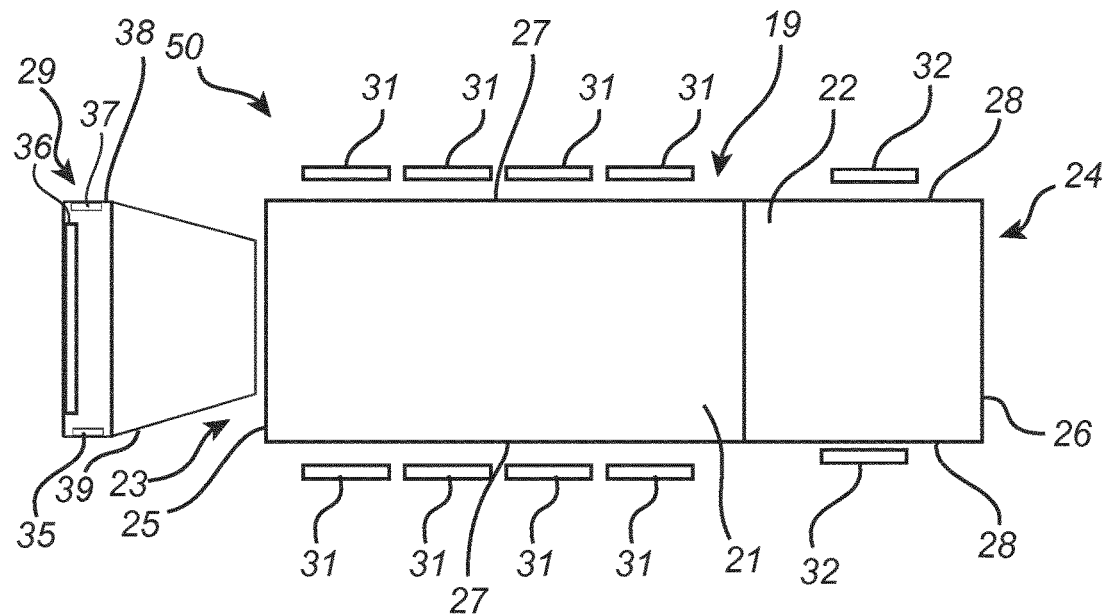

FIG. 5 is a schematic sectional side view of a lighting device 50 according to an embodiment of the present invention. The lighting device 50 illustrated in FIG. 5 is similar to the lighting device 20 illustrated in FIG. 3, and identical reference numerals in FIG. 3 and in FIG. 5 denote the same or similar components, having same or similar function, unless specifically stated otherwise. In contrast to the lighting device 20 illustrated in FIG. 3, the lighting device 50 illustrated in FIG. 5 does not comprise an optical filter 30 (but it might do so). The first light-emitting element 29 of the lighting device 50 illustrated in FIG. 5 comprises three light sources 35, 36, 37 configured to emit light of the first wavelength range. The light sources 35, 36, 37 may for example comprise red LEDs. It is to be understood that the first light emitting element 29 may comprise fewer or more than three light sources. The first light-emitting element 29 further comprises a first optical element 38, 39 configured to receive light emitted by the light sources 35, 36, 37, shape the received light, and emit the shaped light. The first optical element 38, 39 is optically coupled to the second light in-coupling surface of the light guide 19 such that light emitted by the first optical element 38, 39 is coupled into the light guide 19 via the second light in-coupling surface. The first optical element 38, 39 is configured to shape the received light so as to modify the angular distribution within the segments 21, 22 of the light rays of the light emitted by the first optical element 38, 39 (e.g., so as to increase the phase space of the light, or increase the number of different angles of rays of the light e.g. with respect to a main direction in which the light is generally directed) as compared to the light rays of the light emitted by the light sources 35, 36, 37 (i.e. as compared to if there would be no first optical element 38, 39 modifying the light emitted by the light sources 35, 36, 37) such that the angular distribution of the light rays of the light emitted by the first optical element 38, 39 corresponds to, or comes closer to corresponding to, the angular distribution of the light rays of the light within the light guide 19 that has been converted by the respective segments 21, 22. In accordance with the embodiment of the present invention illustrated in FIG. 5 the first optical element 38, 39 comprises a CPC 39 and a light mixing structure 38 configured to receive light emitted by the light sources 35, 36, 37, wherein the light mixing structure 38 is optically coupled with the CPC 39. The light mixing structure 38 is configured to mix the light received from the light sources 35, 36, 37 prior to e.g. the CPC 39 shaping the received light. As illustrated in FIG. 5 the light mixing structure 38 may be (directly) connected to the CPC 39, but this is not required. There may be a relatively small gap or separation between the light mixing structure 38 and the CPC 39 provided that only a relatively small amount of light potentially is lost during the conveyance of light from the light mixing structure 38 to the CPC 39.

Figure 6:
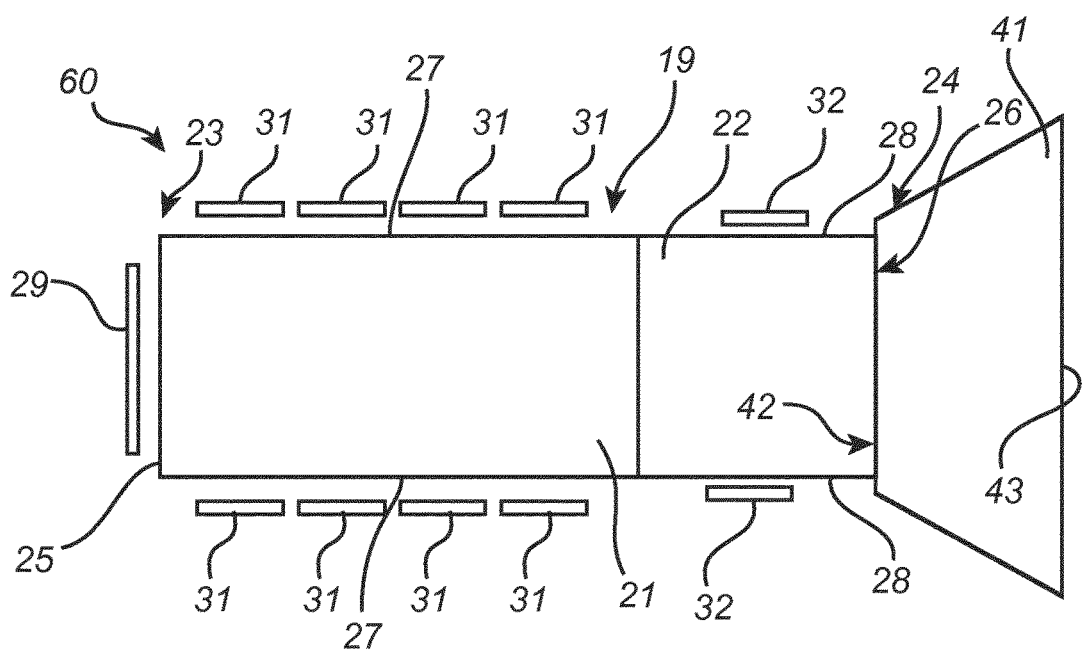

FIG. 6 is a schematic sectional side view of a lighting device 60 according to an embodiment of the present invention. The lighting device 60 illustrated in FIG. 6 is similar to the lighting device 40 illustrated in FIG. 4, and identical reference numerals in FIG. 4 and in FIG. 6 denote the same or similar components, having same or similar function, unless specifically stated otherwise. In contrast to the lighting device 40 illustrated in FIG. 4, the lighting device 60 illustrated in FIG. 6 does not comprise an optical filter 30 (but it might do so). In alternative or in addition to the capability and functionality of the optical element 41 described in the foregoing with reference to FIG. 4, the optical element 41 of the lighting device 60 illustrated in FIG. 6 may be configured to shape light having been in-coupled therein such that only light, the light rays of which have an angular distribution within the angular distribution of the light rays of the light which is in-coupled into the optical element 41 and which is of the first wavelength range, is out-coupled from the light out-coupling surface 43 of the optical element 41.

In conclusion, a lighting device is disclosed. The lighting device comprises a segmented light guide, comprising a plurality of segments, where each segment may be 'pumped' with light via respective first light in-coupling surfaces located on a lateral surface of the light guide, and where each of the segments is configured to convert at least a part of light input therein into light having a selected wavelength range. The light guide extends in an axial direction between a first base surface at one end of the light guide and a second base surface at another end of the light guide, the first base surface and the second base surface being located on different ones of the segments. At least a portion of the first base surface comprises a second light in-coupling surface for coupling of light into the light guide and at least a portion of the second base surface comprises a light out-coupling surface for coupling of light out of the light guide. The lighting device comprises at least one first light-emitting element configured to emit light of a first wavelength range and being optically coupled to the second light in-coupling surface such that light emitted by the at least one first light-emitting element is coupled into the light guide via the second light in-coupling surface, wherein the at least one first light-emitting element is configured so as to reflect at least part of incident light thereon having a wavelength within at least one of the selected wavelength ranges back into the light guide.

While the present invention has been illustrated in the appended drawings and the foregoing description, such illustration is to be considered illustrative or exemplifying and not restrictive; the present invention is not limited to the disclosed embodiments. Other variations to the disclosed embodiments can be understood and effected by those skilled in the art in practicing the claimed invention, from a study of the drawings, the disclosure, and the appended claims. In the appended claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A lighting device comprising:
  a light guide having at least two ends and extending in an axial direction between a first base surface at one of the ends of the light guide and a second base surface at another end of the light guide,
  wherein the light guide comprises a plurality of segments, each segment forming a section of the light guide, each of said segments comprising a first light in-coupling surface located on a lateral surface of the light guide for coupling of light into the light guide, and each of said segments being configured to convert at least a part of light input therein into light having a selected wavelength range,
  wherein the first base surface and the second base surface are located on different ones of said segments, and wherein at least a portion of the first base surface comprises a second light in-coupling surface for coupling of light into the light guide and at least a portion of the second base surface comprises a light out-coupling surface for coupling of light out of the light guide; and
  at least one first light-emitting element configured so as to reflect at least part of incident light thereon having a wavelength within at least one of the selected wavelength ranges back into the light guide, the at least one first light-emitting element comprising:
    at least one light source configured to emit light of a first wavelength range; and
    at least one first optical element configured to receive light emitted by the at least one light source, shape the received light, and emit the shaped light,
  wherein the at least one first optical element is (i) optically coupled to the second light in-coupling surface such that light emitted by the at least one first optical element is coupled into the light guide via the second light in-coupling surface, and (ii) configured to shape the received light so as to modify the angular distribution of the light rays of the light emitted by the at least one first optical element as compared to the light rays of the light emitted by the at least one light source such that the angular distribution of the light rays of the light emitted by the at least one first optical element corresponds to, or comes closer to corresponding to, the angular distribution of the light rays of the light within the light guide that has been converted by the segments.

2. The lighting device according to claim 1, wherein the at least one first light-emitting element is configured to emit red light.

3. The lighting device according to claim 1, further comprising, for each segment of the light guide, at least one second light-emitting element configured to emit light of a second wavelength range into the first light in-coupling surface of the segment.

4. The lighting device according to claim 1, wherein the at least one first light-emitting element comprises a plurality of light sources, and wherein the at least one first optical element is further configured to mix the light received from the plurality of light sources prior to shaping the received light.

5. A luminaire comprising a housing, and a lighting device according to claim 1, provided in the housing.

6. The lighting device according to claim 1, further comprising at least one optical filter, wherein the at least one first light-emitting element is optically coupled to the second light in-coupling surface by way of the at least one optical filter, the at least one optical filter being arranged so as to receive light emitted by the at least one first light-emitting element, wherein the at least one optical filter is configured so as to transmit incident light thereon having a wavelength within the first wavelength range through the optical filter and reflect at least part of incident light thereon having a wavelength within at least one of the selected wavelength ranges back into the light guide.

7. The lighting device according to claim 6, wherein the at least one optical filter comprises at least one dichroic filter or dichroic mirror.

8. The lighting device according claim 1, further comprising a second optical element comprising a light in-coupling surface optically coupled to the light out-coupling surface of the light guide for in-coupling light, having been out-coupled from the light guide, into the optical element, wherein the second optical element is configured to shape light and arranged to out-couple shaped light from a light out-coupling surface of the second optical element.

9. The lighting device according to claim 8, wherein the second optical element comprises at least one collimator, at least one light concentrating element, at least one lens, at least one reflector, or any combination thereof.

10. The lighting device according to claim 1, wherein at least one segment is configured to convert at least a part of light input therein into green light, and at least one other segment is configured to convert at least a part of light input therein into blue light.

11. The lighting device according to claim 10, wherein the segment which includes the first base surface is configured to convert at least a part of light input into the segment into green light, and the segment which includes the second base surface is configured to convert at least a part of light input into the segment into blue light.

12. The lighting device according to claim 11, wherein the at least one first light-emitting element is configured to emit red light, and wherein the lighting device further comprises, for each segment of the light guide, at least one second light-emitting element configured to emit light of a second wavelength range into the first light in-coupling surface of the segment, wherein the at least one second light-emitting element for the segment which includes the first base surface is configured to emit blue light, and the at least one second light-emitting element for the segment which includes the second base surface is configured to emit ultraviolet light.

13. A lighting device comprising:
a light guide having at least two ends and extending in an axial direction between a first base surface at one of the ends of the light guide and a second base surface at another end of the light guide, wherein the light guide comprises a plurality of segments, each segment forming a section of the light guide, each of said segments comprising a first light in-coupling surface located on a lateral surface of the light guide for coupling of light into the light guide, and each of said segments being configured to convert at least a part of light input therein into light having a selected wavelength range, wherein the first base surface and the second base surface are located on different ones of said segments, and wherein at least a portion of the first base surface comprises a second light in-coupling surface for coupling of light into the light guide and at least a portion of the second base surface comprises a light out-coupling surface for coupling of light out of the light guide; and
at least one first light-emitting element, configured to emit red light and being optically coupled to the second light in-coupling surface such that light emitted by the at least one first light-emitting element is coupled into the light guide via the second light in-coupling surface, wherein the at least one first light-emitting element is configured so as to reflect at least part of incident light thereon having a wavelength within at least one of the selected wavelength ranges back into the light guide.

14. A lighting device comprising:
a light guide having at least two ends and extending in an axial direction between a first base surface at one of the ends of the light guide and a second base surface at another end of the light guide, comprising a plurality of segments, each segment forming a section of the light guide, each of said segments comprising a first light in-coupling surface located on a lateral surface of the light guide for coupling of light into the light guide, and each of said segments being configured to convert at least a part of light input therein into light having a selected wavelength range, wherein the first base surface and the second base surface are located on different ones of said segments, and wherein at least a portion of the first base surface comprises a second light in-coupling surface for coupling of light into the light guide and at least a portion of the second base surface comprises a light out-coupling surface for coupling of light out of the light guide;
at least one first light-emitting element configured to emit light of a first wavelength range and being optically coupled to the second light in-coupling surface such that light emitted by the at least one first light-emitting element is coupled into the light guide via the second light in-coupling surface, wherein the at least one first light-emitting element is configured so as to reflect at least part of incident light thereon having a wavelength within at least one of the selected wavelength ranges back into the light guide;
wherein the segment which includes the first base surface is configured to convert at least a part of light input into the segment into green light, and the segment which includes the second base surface is configured to convert at least a part of light input into the segment into blue light;

wherein the at least one first light-emitting element is configured to emit red light, and wherein the lighting device further comprises, for each segment of the light guide, at least one second light-emitting element configured to emit light of a second wavelength range into the first light in-coupling surface of the segment, wherein the at least one second light-emitting element for the segment which includes the first base surface is configured to emit blue light, and the at least one second light-emitting element for the segment which includes the second base surface is configured to emit ultraviolet light.

* * * * *